C. F. PATTERSON.
SUPERVISORY SIGNAL SYSTEM.
APPLICATION FILED JAN. 17, 1907.
931,704.
Patented Aug. 17, 1909.
3 SHEETS—SHEET 1.
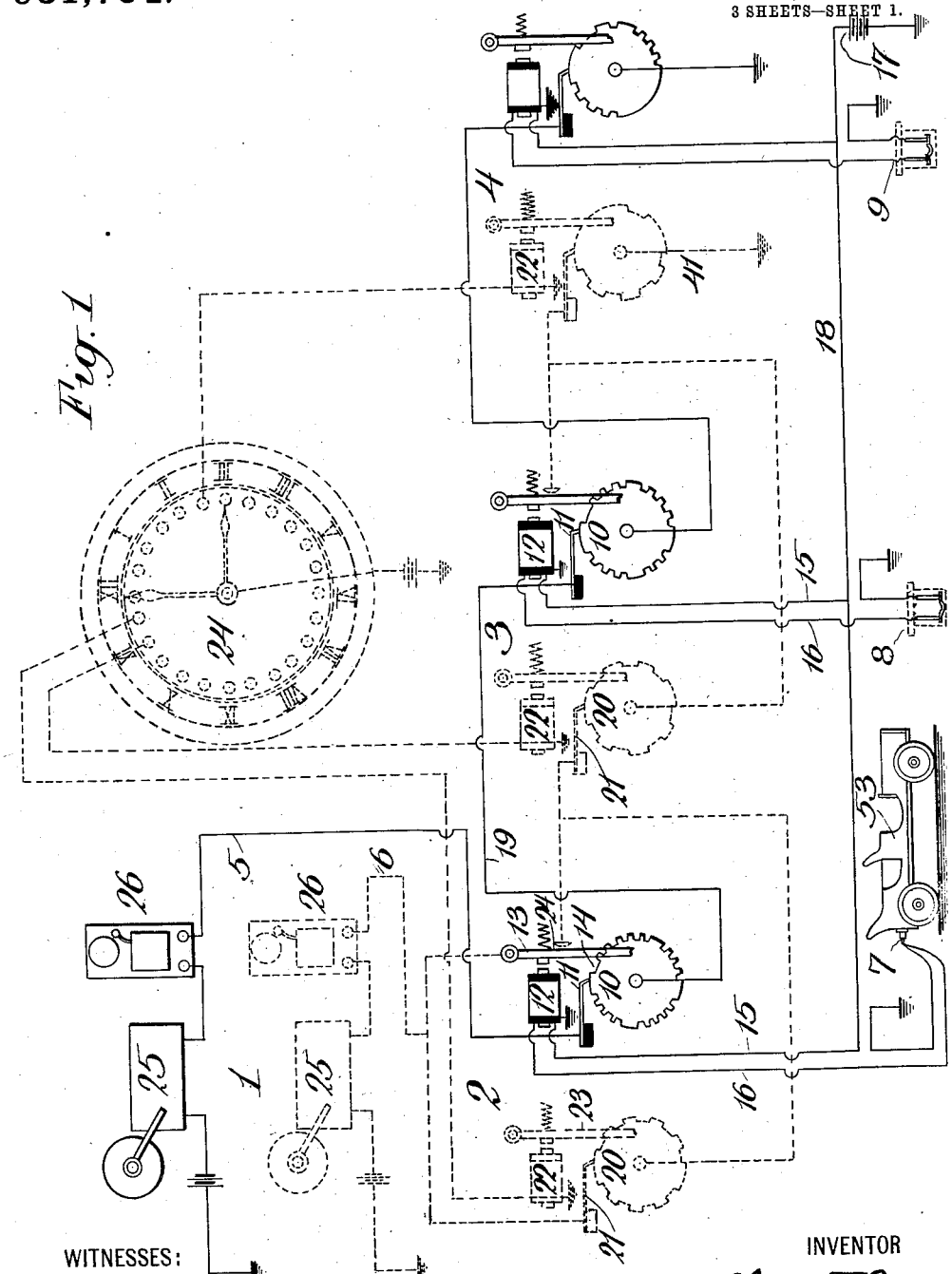
WITNESSES:
INVENTOR
Charles F Patterson
BY
ATTORNEY C. F. PATTERSON.
SUPERVISORY SIGNAL SYSTEM.
APPLICATION FILED JAN. 17, 1907.
931,704.
Patented Aug. 17, 1909.
3 SHEETS—SHEET 2.
Fig. 2,
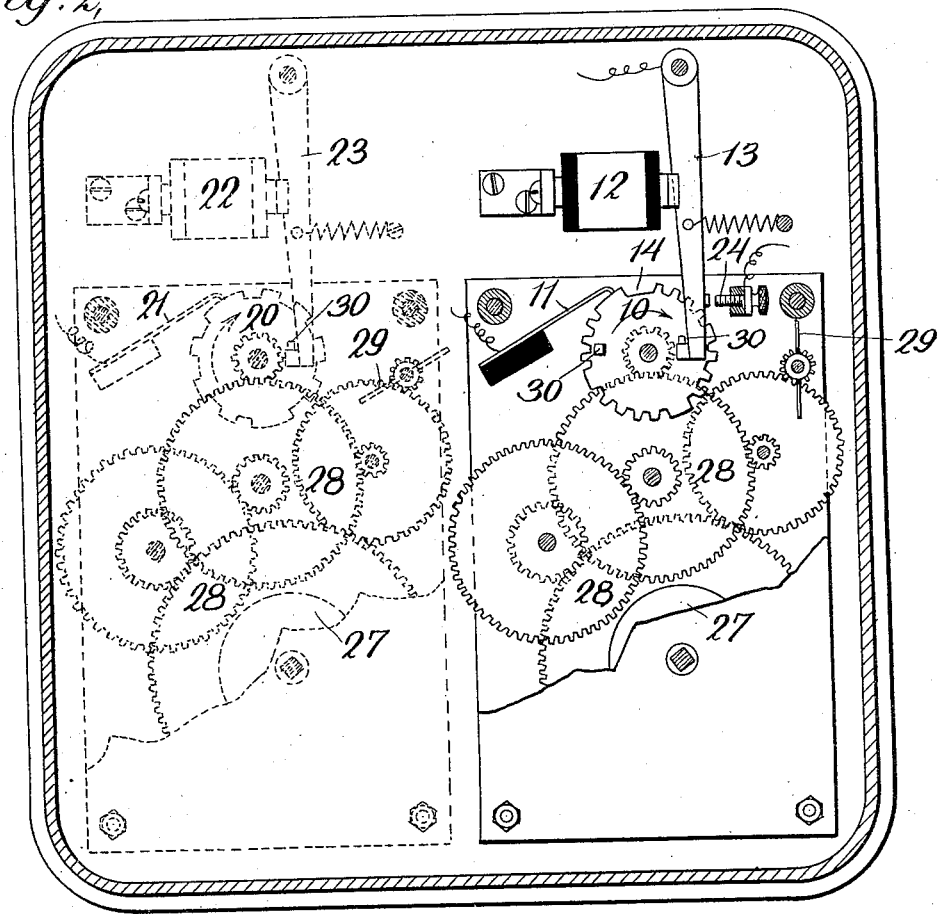
Fig. 3,
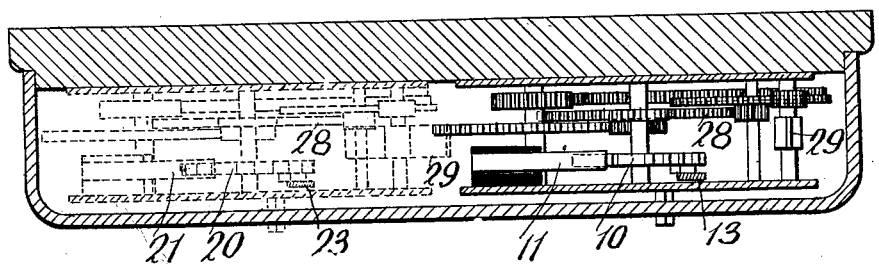
WITNESSES:
Harry Gross.
J. Ulmer Boyce
INVENTOR
Charles F. Patterson
BY
H. M. Marble
ATTORNEY C. F. PATTERSON.
SUPERVISORY SIGNAL SYSTEM.
APPLICATION FILED JAN. 17, 1907.
931,704.
Patented Aug. 17, 1909.
3 SHEETS—SHEET 3.
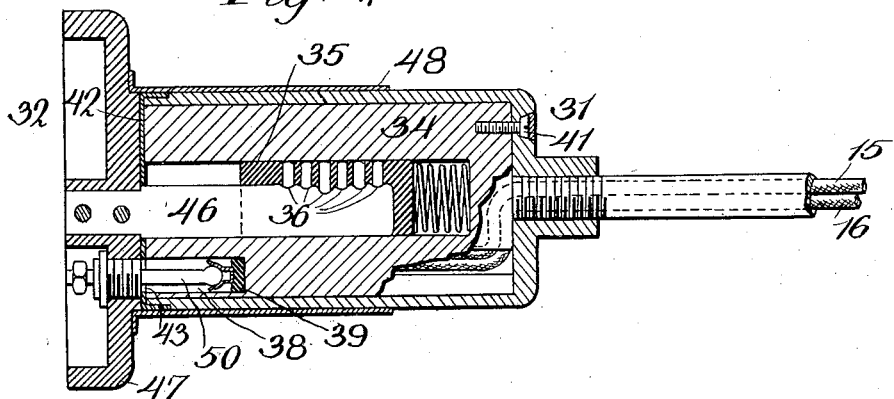
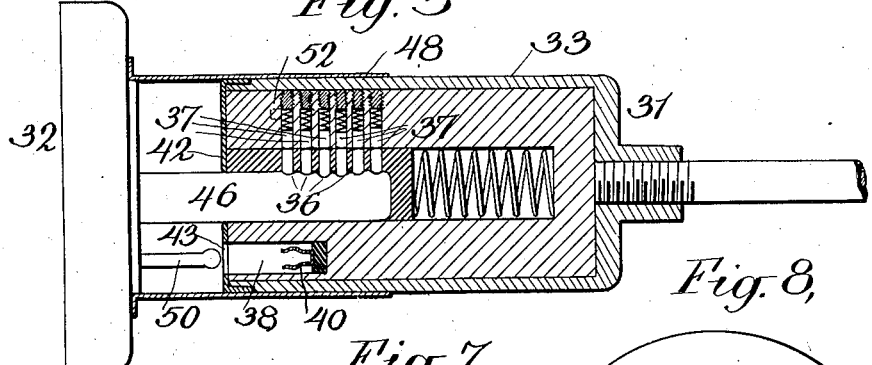
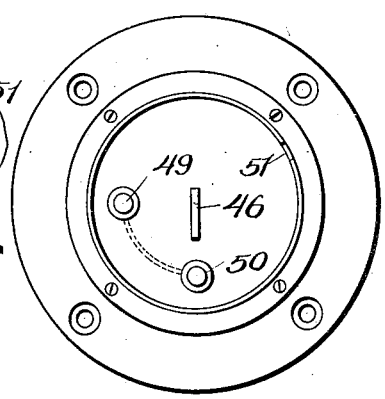
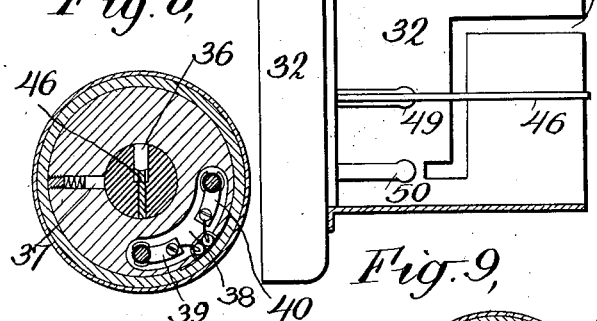
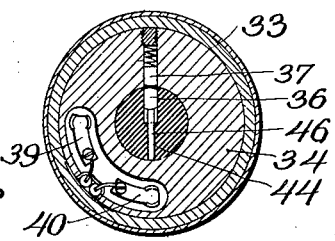
WITNESSES:
INVENTOR
Charles F. Patterson
BY
H. M. Marble
ATTORNEY

UNITED STATES PATENT OFFICE.

CHARLES F. PATTERSON, OF NEW YORK, N. Y.

SUPERVISORY SIGNAL SYSTEM.

No. 931,704.     Specification of Letters Patent.     Patented Aug. 17, 1909.

Original application filed June 14, 1906, Serial No. 321,725. Divided and this application filed January 17, 1907. Serial No. 352,778.

*To all whom it may concern:*

Be it known that I, CHARLES F. PATTERSON, a citizen of the United States, residing at New York, in the county of New York and State of New York, have invented a certain new and useful Supervisory Signal System; and I do hereby declare the following to be a full, clear, and exact description of the same, such as will enable others skilled in the art to which it appertains to make and use the same.

My invention relates to an electric supervisory signaling and indicating system designed to indicate and register the movements to and from their respective home stations, of each and all of a plurality of objects removable from such home stations, such as vehicles, horses, etc., and the approximate time of arrival and departure.

The present application is a division of my application filed June 14th, 1906, Sr. No. 321,725 (Patent No. 852,344, dated April 30, 1907).

My system comprises transmitting devices, one for each vehicle or other removable object to be supervised, with automatic means for causing the operation of each such transmitting device when its corresponding removable object leaves its home station and again when such object returns to its home station; and my system further comprises suitable indicating and recording devices, which may be, and customarily will be, located at a central station distinct from the home station of such removable objects, and suitable circuits connecting the transmitting devices with such central station indicating and recording apparatus. A large number of transmitting devices may be connected by the same circuits to the same central station recording and indicating apparatus.

My invention is particularly suitable for use in connection with stables, automobile garages, and the like, where a large number of vehicles, horses, etc., belonging to different owners, are kept, and enables the owner of any such vehicle, horse, or other removable object to have automatically recorded the movements of the same from such home station, quite independent of the stable or garage records and by apparatus not under the control of the stable or garage employees.

The objects of my invention are to supervise the movements to and from their respective home stations, of vehicles, horses and other removable objects; to indicate automatically when each such vehicle or removable object departs from its particular home station, and when it is returned thereto; to make the apparatus simple, durable, reliable, and easily operated; to permit the use of a single indicating and recording set, and common circuits, for a large number of transmitting devices of the system; to prevent false manipulation or operation of the transmitting apparatus of the system; and to provide for the automatic periodic testing of the circuits and apparatus of the system.

I will now proceed to describe my invention with reference to the accompanying drawings, illustrating one arrangement of the circuits and apparatus for carrying out my invention, and will then point out the novel features in claims.

In the said drawings: Figure 1 shows diagrammatically the transmitting instrument circuits and central station apparatus of a system embodying my invention; the parts of the circuits and apparatus related to the time-controlled portion of the system, which are not specifically claimed herein, being shown in dotted lines. Fig. 2 shows a side view, with the cover of the inclosing case removed, of one of the transmitting instruments of my system; the time-circuit transmitting mechanism being shown in dotted lines. Fig. 3 shows a transverse section downward, of such transmitting instrument, the section being taken just below the operating magnets of the apparatus; the time-circuit transmitting mechanism being shown in dotted lines. Figs. 4-9 inclusive, are detail views of the automatic separable circuit control device of my system, comprising two relatively individualized co-acting members, by the separation or uniting of which the operation of the transmitting apparatus is caused; Fig. 4 showing a longitudinal section of the plug and socket fully connected; Fig. 5 showing a similar view with the plug in its first position; Fig. 6 showing a transverse section corresponding to Fig. 4; Fig. 7 showing a longitudinal section of the socket; Fig. 8 an end view thereof, and Fig. 9 a transverse section corresponding to Fig. 5.

Referring to the said drawings and at first to Fig. 1 thereof, 1 designates a central station at which the recording and indicating devices are located, 2, 3 and 4 designate transmitting apparatus, 5 and 6 designate main line circuit conductors connecting the central station apparatus with said transmitting apparatus, and 7, 8 and 9 designate separable circuit controlling devices, such as shown in Figs. 4–9 inclusive, for transmitting instruments 2, 3 and 4 respectively. Each transmitting instrument of my system comprises a transmitting mechanism which may with advantage be of the general type employed in district messenger service, fire alarm service, and the like, comprising a toothed transmitting wheel and corresponding contact brush or "pen", said wheel toothed to transmit telegraphically a number or other code-character, characteristic of that particular transmitting instrument. Said transmitting mechanism is arranged to transmit over circuit 5 (which circuit may be termed the "alarm circuit" to distinguish it from circuit 6 hereinafter more particularly referred to) the number or code designation of that box at the time of departure of the vehicle or other object supervised from its home station, and again at the time of return of such device to such home station; and customarily I so arrange the transmitting device that the latter alarm is accompanied by a further distinctive signal to indicate that it is a return signal and not a departure signal. In this way the central station attendant is apprised whenever any particular vehicle or like object supervised, departs from its home station, and when it returns thereto. Preferably also each transmitting instrument comprises a further transmitting mechanism which may with advantage be of the same general type as the other but which is controlled by means for causing it to operate periodically—for example a time clock, and which, when so operated periodically, transmits through circuit 6 shown in dotted lines and which may be termed the "time circuit" to distinguish it from circuit 5, a suitable number or code designation—preferably the same as that transmitted by the corresponding alarm circuit transmitting mechanism; and I so arrange the alarm circuit transmitting mechanism, that during the absence of the vehicle or other article corresponding to such transmitting mechanism from its home station, the time or periodic signals will be cut out. Proper record being made of the signals of the two circuits 5 and 6 said records will perfectly check each other; likewise the periodic operation of the apparatus of the time circuit shows clearly that the apparatus and circuits of the system are in operative position.

Taking up now the detail description of the apparatus, and first of all the construction of the transmitting apparatus of box 2 for example (the mechanism of the other boxes may be the same), 10 designates the transmitting wheel for the alarm circuit, 11 the pen or contact brush therefor, 12 a controlling magnet for said wheel and 13 the armature lever for such magnet, controlling an escapement mechanism more fully shown in Figs. 2 and 3. To differentiate the departure and arrival signals from this transmitting device, I have shown this wheel provided with two series of notches, each comprising the number of the box, but the second including as well, a dash notch 14. The escapement mechanism is arranged to cause half a revolution of wheel 10 upon the departure of the vehicle supervised, and to cause a further half rotation of the wheel upon the return of such vehicle, the pen 11 encountering the dash notch 14 only near the conclusion of the second half revolution.

For present purposes the separable controlling devices 7, 8 and 9 etc., of the several boxes may be assumed to be devices which, when the vehicle supervised is at its home station, closes a local controlling circuit 15—16, passing through the magnet 12; current being supplied to this circuit by any convenient means, as for example, a battery 17 and current lead 18, which may be common to all the transmitting devices or any convenient number thereof. When this controlling circuit 15—16 is broken upon the departure of the vehicle supervised by box 2 and the consequent operation of the controlling device 7, magnet 12 is deënergized, the escapement mechanism of wheel 10 is operated and said wheel permitted to revolve one half revolution. Upon the closing of said circuit 15—16, at device 7, magnet 12 is energized, the escapement mechanism of the wheel 10 is again operated and said wheel is permitted to revolve back to its starting point, in so doing sending the number of the box together with a dash. The line circuit 5 passes from brush 11 through wheel 10 and conductor 19 to the brush 11 of the next box, and so on, the alarm signal transmitting device of the several boxes being therefore connected in series in a normally closed circuit.

The time circuit signaling device of the several boxes, comprise each a toothed contact wheel 20 with pen or contact brush 21, and are each controlled by a magnet 22 and an armature lever 23 operating release mechanism. A time clock 24 controls the magnets 22 of a series of boxes and periodically energizes the magnets 22 of such series in succession. I do not limit myself to any particular type of time clock contact device, but may use any such device suitable for the purpose. In the drawings I have indicated said time clock as provided on its dial with a circular series of contact points over which the minute hand of the clock, acting as a brush or "wiper", sweeps successively. Circuits radiate from the various contact points on the dial to the several magnets 22. As the minute hand rotates therefore, the several magnets 22 are energized successively, each for an instant only, but for long enough to release the corresponding contact wheel and permit rotation of the same to begin; said wheel continuing to rotate until its revolution is completed, when it is arrested automatically by the detent arm 23. If the object supervised by any one of these transmitting boxes is at its home station when the time circuit wheel 20 of that box is caused to rotate as described, the signal of that box will be transmitted through circuit 6 and recorded at the central station. But if the object supervised by such box is not at its home station when the contact wheel 20 of that box rotates as described, the rotation of said wheel will be ineffective owing to the fact that, magnets 12 being deënergized, arm 13 has closed a shunt circuit contact 24 by which the wheel 20 and pen 21 of that box are shunted with respect to the line circuit, so that no interruption of line circuit 6 is caused by their operation. So long as the object supervised is away from its home station therefore, the periodic signals will not be received from the corresponding transmitting device. At the central station each of circuits 5 and 6 has its own register 25 and bell or other audible signaling device 26.

In Figs. 2 and 3 I have shown the mechanism of one of the transmitting boxes, the same numerals being employed as in Fig. 1. For rotating the toothed contact wheels I have shown normally-wound spring motors 27, driving the contact wheels through customary gear-trains 28, the speed of rotation being controlled by fans 29. The armature levers 13 and 23 may control the rotation of the contact wheels by means of any suitable detent or escapement device. In the construction shown, these detent or escapement devices are very simple, consisting merely of pins 30 on the contact wheels, arranged to be engaged by the ends of the armature levers 13 and 23 respectively. Since wheel 10 is to rotate only half a revolution each time it operates, once when magnet 12 is deënergized, and again when magnet 12 is reënergized, said wheel is provided with two pins 30, placed at different radial distances, so that when said magnet is deënergized and its armature lever, flying out, releases one pin 30, it is in position to engage the other pin 30 when the half revolution of the contact wheel is complete; and similarly, when the magnet 12 is again energized and its lever 13 releases that pin 30, it moves into position to engage the other pin 30. It is intended that the minute hand of the time clock 24 (Fig. 1) or other contact device with which said clock may be provided, will be in contact with each contact point of the series for less time than it takes the contact wheels 20 of the corresponding transmitter boxes to rotate, so that each armature lever 23, after releasing the pin 30 of its contact wheel 20, will be back again to engage and arrest the pin 30 upon the completion of the rotation of such contact wheel.

I do not confine myself to any particular contact device for the local controlling circuits 15—16 of the transmitter boxes, but may employ that shown in Figs. 4–9 inclusive, which forms the subject-matter of a separate application for Letters Patent, filed June 29, 1906. Sr. No. 324,008 (Patent No. 852,395, dated April 30, 1907). It is desirable that the contact device employed shall comprise two separable coacting members, one adapted for connection to the vehicle or other movable object to be supervised, the other for connection to the conductors of circuit 15—16, the two members relatively individualized so that each may be used only with the other. This is exceedingly important, in order that the transmitter for each vehicle may be operated only when that particular vehicle is taken out or returned, and in order that it may be impossible to falsely indicate at the central station the return of a vehicle, by the application of a dummy member to the circuit-terminal member of the corresponding contact device. The contact device shown in Figs. 4–9 fulfils these requirements, being provided with tumbler mechanism much like that of so-called "Yale" locks, serving to individualize the members of one contact device from those of any desired number of similar contact devices.

In Figs. 4–9 inclusive, 31 designates the plug member of the device, forming the terminal members for conductors 15 and 16 of Fig. 1, and 32 designates the socket for receiving said plug. Said plug comprises an outer shell 33, preferably of strong metal, an intermediate member 34, fitting within said shell, and an inner member 35, rotatable somewhat with respect to members 33 and 34, and carrying within it a series of plug-shaped tumblers, 36, of varying length, adapted to coact with similar tumblers 37, mounted in cells in member 34, and spring-actuated, as shown. Members 33 and 34 inclose between them a chamber 38, containing terminal clips 39 and 40 for conductors 15 and 16 respectively, and said members 33 and 34 are separable for convenience in wiring the plug, said members being rigidly connected, once the wires have been connected, by suitable means, as for example by screws 41 having their heads sealed over. The tumbler-barrel 35, has secured to it a gate, 42, normally closing the end of member 34 and preventing access to the circuit terminals 39 and 40; but this gate has in it an opening 43, which may be brought into registry with chamber 38 by inserting into the slot 44 of the tumbler barrel 35 a suitable key which will line up all of the tumblers 36 and 37 with their adjacent faces just at the dividing line between members 34 and 35. The socket member 32 comprises such a key, 46, secured to the recessed base 47 of the socket member, and protected by the tubular shell 48 into which the plug 31 fits. The operation of this contact device is as follows: Supposing plug 31 and socket 32 to be separated, to connect them the plug is introduced into the socket, the key 46 fitting within the slot 44. The socket is pressed in straight as far as it will go—i. e., until the key is fully home. If the socket and plug correspond, the tumblers of the plug will now all be lined up as shown in Fig. 5, with their adjacent faces just at the parting between the tumbler barrel 35 and member 34. The plug may now be rotated a few degrees, the tumbler barrel 35 being held stationary by key 46, which has the effect of moving the orifice 43 in gate 12 into line with chamber 38. After which the plug may be pressed in still farther; tumbler-barrel 35 retreating back into member 34; and this final movement of the plug 31 brings contact fingers 49 and 50 into contact with terminal clips 39 and 40. These fingers 49 and 50 being in electrical connection, as shown in Fig. 8, wires 15 and 16 are now in connection, and circuit 15—16 is closed.

To disengage the plug 31 from the socket 32, the operations above described are reversed, whereupon the tumbler-barrel 35 is pressed out by its spring 45, the gate 42 closes contact chamber 38, the tumblers 37 come opposite the corresponding tumblers 36; and, as the plug is withdrawn completely, said tumblers 37, being pressed outward, enter to a greater or less extent the barrel 35, preventing rotation thereof. It will be seen that when the plug is removed from its socket, the circuit terminals are entirely sealed against access; nor can the contact chamber be opened except by means of a key corresponding to the key of the particular socket to which the plug corresponds.

As is well known, the permutations possible by varying the length of the tumblers of a locking mechanism such as shown are almost without limit; likewise such mechanisms may be installed in groups and sub-groups, adjusted to have a master-key for the entire group and individual master-keys for the different sub-groups, the same as is now done with locks. This greatly facilitates the work of inspectors, each of whom may have a master-key for the particular group or sub-group in his charge. The keys 46 are so inclosed by the shells 48 of the socket-members, that it is difficult to obtain access to said keys to take impressions therefrom, and an attempt to take such an impression is almost sure to be detected.

In the case of vehicles, it is contemplated that the socket members 32 shall be permanently secured to some convenient portion of the vehicle, it being necessary, therefore, to detach the plug 31 from its socket 32, before the vehicle can be taken away from its home station. 53, in Fig. 1, designates a vehicle having a socket so attached. The plug may be connected to its transmitting box by flexible conductors 15 and 16 of such length as to permit the vehicle to be moved somewhat, as for cleaning and inspection, without disconnecting the plug from its socket.

In the case of horses or other animals, the socket 32 may be secured permanently to a halter or collar or harness locked on the animal. The shells 48 of the sockets 32 are provided with bayonet-grooves 51 adapted to receive projections 52 on the plugs 31, whereby the correct rotation of the plug in its socket is insured.

It will be obvious that the transmitting contact wheel 10 and parts associated therewith, and the circuit 5, are quite independent of the transmitting device including the contact wheel 20 and of the circuit 6, and that there is a complete system without these parts. However, for various reasons it is desirable to combine the time circuit and its apparatus with the alarm circuit and its apparatus.

What I claim is:—

1. The combination with a supervisory signal system comprising receiving means, circuits, and a plurality of transmitters, of a plurality of objects to be supervised, removable with respect to said transmitters, and provided with means whereby said transmitters are operated upon the removal and upon the return of such objects, the said means of the several objects relatively individualized with respect to one another, whereby no one of said means may operate in place of another.

2. The combination with a supervisory signal system comprising receiving means, circuits, and a plurality of transmitters, and operating means for said transmitters comprising removable means adapted to be secured to objects to be supervised, of objects to be supervised to which said removable means are secured, said objects removable with respect to the corresponding transmitters, the said removable means relatively individualized with respect to one another, whereby no one of them may be used in place of another.

3. The combination with a supervisory signal system comprising receiving means, circuits, and a plurality of transmitters, operating means for said transmitters comprising a local circuit for each, and a contact device therefor comprising separable co-acting portions, one adapted for connection to an object to be supervised, the like members of the several contact devices relatively individualized with respect to one another, whereby no one of them may be used in place of another, of a plurality of objects to be supervised, one for each such transmitter, and each having connected to it the said removable member of the contact device of the corresponding transmitter.

4. In a supervisory signaling system, the combination of a line circuit, a plurality of transmitting means, and a plurality of controlling devices, one for each such transmitting means, comprising separable members, one adapted for attachment to an object to be supervised, the other connected to said transmitting means, like members of said controlling devices relatively individualized with respect to one another, whereby no one of them may be used in place of another.

5. In a supervisory signaling system, the combination of a line circuit, a plurality of transmitting means, and a plurality of controlling devices, one for each such transmitting means, comprising a separable members, one adapted for attachment to an object to be supervised, the other connected to said transmitting means, like members of said controlling devices comprising individualizing means, whereby no one of them may be used in place of another.

6. In a supervisory signaling system, the combination of a line circuit, a plurality of transmitting means electrically controlled, and a separate circuit-controlling device for each comprising separable members, one adapted for attachment to an object to be supervised, the other electrically connected to controlling means of said transmitting means, like members of the several circuit controlling devices comprising individualizing means, whereby no one of them may be used in place of another.

7. In a supervisory signaling system, the combination of a line circuit, a plurality of transmitting means electrically controlled, and a separate circuit-controlling device for each comprising separable members, one adapted for attachment to an object to be supervised, the other electrically connected to controlling means of the corresponding transmitting means, like members of said circuit-controlling devices relatively individualized, whereby no one of them may be used in place of another.

8. In a supervisory signaling system, the combination of a line circuit, a plurality of transmitting means, and a separate controlling device for each comprising two separable members, namely, a plug and a socket therefor, the one adapted for attachment to an object to be supervised, the other connected to controlling means of said transmitting means, like members of the several controlling devices relatively individualized, whereby no one of them may be used in place of another.

9. In a supervisory signaling system, the combination of a line circuit, a plurality of transmitting means, and a separate controlling device for each comprising two separable members, namely, a plug and a socket therefor, the one adapted for attachment to an object to be supervised, the other connected to controlling means of said transmitting means, each said plug and socket relatively individualized, whereby each may co-act only with the other.

10. In a supervisory signaling system, the combination of a line circuit, a plurality of transmitting means comprising electrically-operated controlling means, and a separate circuit controller for each such transmitting means comprising two separable members, namely, a plug and a socket therefor, one adapted for connection to an object to be supervised, the other electrically connected to the controlling means of the corresponding transmitter, each said plug and socket comprising means whereby the corresponding transmitting means is operated upon the separation and again upon the uniting of said plug and socket, and comprising also individualizing means whereby the coaction of the plug with any other socket is prevented.

11. In a supervisory signaling system, the combination of a line circuit, a plurality of transmitting means comprising electrically-operated controlling means, and a separate circuit controller for each transmitting means comprising two separable members, namely, a plug and a socket therefor, one adapted for connection to an object to be supervised, the other electrically connected to the controlling means of the corresponding transmitter, each said plug and socket comprising means whereby the corresponding transmitting means is operated upon the separation and again upon the uniting of said plug and socket, and further comprising key-and-lock means whereby said plug may operate only with its corresponding socket, and vice versa.

12. In a supervisory signaling system, the combination of transmitting means and a controlling device therefor comprising two separable members, provided the one with a key and the other with corresponding lock mechanism, said controlling device adapted to cause the operation of said transmitting means upon the separation or upon the uniting of its said members.

13. In a supervisory signaling system, the combination of a line circuit, a plurality of transmitting means therein, and a corresponding plurality of controlling devices therefor, one for each such transmitting means, such circuit controlling devices comprising each separable members relatively individualized, whereby each such member will co-act only with its corresponding member and not with any of the other similar members of the system.

14. In a supervisory signaling system, the combination of a line circuit, a plurality of transmitting means therein, separate controlling circuits for such several transmitting means and separate controlling devices in such controlling circuits, each such controlling device comprising separable members relatively individualized, whereby each such member will coact only with its corresponding member and not with any of the other similar members of the system.

15. In a supervisory signaling system, the combination of a line circuit, a plurality of transmitting means therein, separate controlling circuits for such several transmitting means and separate controlling devices in such controlling circuits, each such controlling device comprising a plug and socket relatively individualized, whereby each plug may co-act with its corresponding socket and not with any other socket of the system and whereby each socket may co-act with its corresponding plug and not with any other plug of the system.

In testimony whereof I affix my signature, in the presence of two witnesses.

CHARLES F. PATTERSON.

Witnesses:
M. M. SHARP,
H. M. MARBLE.